Patented Dec. 3, 1946

2,412,153

UNITED STATES PATENT OFFICE 2,412,153

PROCESS OF ENRICHING CEREAL GRAINS WITH NATURAL VITAMINS

Erich Gustav Huzenlaub, Brentford, England

No Drawing. Application August 30, 1943, Serial No. 500,560

9 Claims. (Cl. 99—11)

My invention relates to processes for enriching cereal grains with natural vitamins.

In my United States Patent No. 2,287,737, I have described a process for enriching the endosperm of cereal grains with natural water-soluble vitamins by steeping the whole grain in hot water for a period of time under predetermined pressure and temperature conditions. I have also developed an alternative process of enriching the endosperm of cereal grains with such natural vitamins by steeping the grains in water which is enriched with the vitamins dissolved out of bran or similar material. This enrichment of the steeping water with vitamins obtained from bran may occur in the steeping vessel in which the grain itself is treated and simultaneously with such treatment by charging the vessel with both grain and bran, or may occur in a preliminary step wherein the vitamins are dissolved out of the bran into the steeping water before the grain is steeped in the vitamin extract thus formed.

The use of bran as a source of vitamins for enrichment of the endosperm of grain is attendant with several important technical and economic problems which materially detract from the commercial utility of this process. One of the most important of these problems is that of separating the bran from the extract of steeping water and vitamins, since it is almost impossible to effect such separation by ordinary filters or other known mechanical processes. An appreciable quantity of starch from the bran passes into the steeping water and a part of this starch is swelled and/or partly or wholly gelatinized. It is exceedingly difficult and time consuming to remove such gelatinized or swelled starch from the steeping water and this cannot be economically effected under actual operating conditions. Additionally, if and when the bran should become separated by the necessary elaborate means, the bran will have to be dried to a commercial moisture content.

For example: in order to improve, under practical manufacturing conditions, the vitamin $B_1$ content of the endosperm of the grain, having a total natural vitamin $B_1$ content of, say, 1 I. U. per gram by as little as 10%, it is necessary to use bran having approximately $\frac{1}{10}$ of the weight of the grain to be treated. This large quantity of bran delivers appreciable amounts of starchy material to the steeping water and in order to prevent this steeping water from being too thick for proper treatment of the grain and for subsequent separation from the grain by draining, it is necessary to use larger quantities of steeping water than would otherwise be necessary. This presents the economic disadvantage of providing larger and more extensive equipment and of requiring larger quantities of heat and power for heating and handling the increased quantities of steeping water.

The foregoing disadvantages are greatly magnified where an attempt is made to increase the vitamin content of the endosperm by an amount exceeding 10%, and such magnified disadvantages will, under practical manufacturing conditions, be rather the rule than the exception, as a vitamin $B_1$ increase of 10% of the total original $B_1$ content of the whole grain cannot be considered an increase which would represent a practical improvement in the health-sustaining or vitamin properties of the endosperm of a cereal grain. It is, for instance, an established fact that the vitamin $B_1$ content of a 60% extraction flour made from wheat ranges between 0.15 and 0.35 I. U.'s per gram of flour and that, in order to provide adequate health protective values of $B_1$, in such flour, the $B_1$ content of it should be increased to approximately 1 I. U. per gram. An object of my invention is to provide a process which will produce maximum enrichment of the endosperm with the vitamins naturally present in grain without the disadvantages attendant upon the use of bran as a source of such vitamins.

Another object of my invention is to provide a new and improved process for enriching the endosperm of grain with such natural vitamins to produce maximum enrichment with a minimum of equipment and processing cost.

Another object of my invention is to provide a new and improved process for the enrichment of the endosperm of grain with such natural vitamins by utilizing a product of little commercial value and making substantially all of the bran available for animal feed or other commercial purposes in the usual way.

Another object of my invention is to provide a new and improved process for the enrichment of the endosperm of cereal grain with such natural vitamins by utilizing a material which is rich in such vitamins and which may readily be separated from the steeping water to permit this steeping water to be re-used repeatedly in the treatment of successive batches of grain.

Another object of my invention is to provide a new and improved process for enriching the endosperm of cereal grains with such natural vitamins and wherein the source material for the vitamins contains no appreciable amount of starch so that the steeping water remains substantially free of starch and such small quantities of starch as are imparted to the steeping water can be readily removed by a filter or other conventional means.

Other objects and advantages of my invention will become apparent as the description proceeds.

In wheat grains, a layer of material which is part of the husk and is known as the scutellum lies between the germ and the endosperm. I have found that where wheat grain is enriched with natural vitamins by either of the processes hereinabove discussed, a large proportion of the vitamins present in the steeping water is absorbed by the scutellum which has a high degree of attraction for such vitamins of the B complex and particularly for vitamin B1. There is, however, a saturation point beyond which the scutellum can absorb no further such vitamins. In the conventional milling operations for producing white wheat flour from wheat grains, the scutellum, together with the germ and husk, is separated from the starch and proteins of the endosperm which latter are ground into flour. The scutellum is a quantitatively small part of the bran or of the bran and germ when the germ is separated from the bran.

I have found that if this scutellum is separated from the bran and germ and is ground to a powder and if this powdered scutellum is then exposed to water or other liquid vitamin solvents, the solvent readily dissolves the vitamin content out of the powdered scutellum. My process comprises the steps of removing the scutellum from the bran and germ, grinding this scutellum to a powder, and introducing this powdered scutellum into the vessel in which the grain is to be steeped in such manner as to impart to the endosperm of the grain the vitamins present in the steeping liquid. In lieu of introducing the powdered scutellum into the steeping vessel, this scutellum may be introduced into the steeping liquid before this liquid is introduced into the steeping vessel.

One way of practicing my present invention is to steep the first batch of a series of batches of wheat grains in the manner described in my said United States Patent. This will cause most of the vitamins in the husk and germ of the grain to be transferred to the scutellum. After the steeping treatment has been completed, the steeping liquid is drained and collected in a tank for re-use. The treated grain can then be gelatinized, if desired, by application of heat and pressure and subsequently dried to the desired extent for milling, or the gelatinization step may be omitted and the grain dried directly after the steeping step has been completed. The grain is then milled in the usual manner and the scutellum is separated from the germ and bran resulting from the milling operation. Most of the natural vitamins of the grain are retained in the scutellum which, therefore, forms a relative rich source of natural vitamins of the B complex.

This scutellum is then ground to a powder and is introduced into the steeping liquid drained from the first batch either by placing the powdered scutellum in the steeping liquid before the second batch of grain is immersed therein or simultaneously with such immersion. The process is repeated in the same manner for successive batches of grain with a continuous increase of vitamin content in the scutellum in each succeeding batch of grain until the vitamin saturation point of the scutellum is reached. This would occur only after numerous batches of wheat have been treated. From thereon, in all successive batches of wheat grains thus treated by the process, the scutellum recovered from such batches will contain the maximum quantity of natural vitamins of the B complex which it is capable of absorbing. Complete vitamin saturation of the scutellum of the grain of any given batch being treated is only reached where the steeping water contains a concentration of vitamins sufficiently high to provide such saturation and also to provide additional vitamins for introduction into the endosperm in appreciable and controllable quantities. Thereafter, the degree of enrichment of the endosperm can be readily controlled by returning to the steeping water all or any desired proportion of the powdered scutellum from a previously treated batch of wheat grain.

Before each re-use of the steeping water, this water is preferably passed through any suitable filter capable of removing odors, organic material and coloring matter, bacteria, gases and the like. The starch content of this steeping water is so low that it can readily be removed by known filtering methods and apparatus without difficulty. This filtering step readily removes all objectionable odors, bacteria, organic material, gas, gases, coloring material, etc., so that the steeping water can be re-used without limit and it is only necessary to add such additional water as may be necessary to replace water which has been absorbed by the grain or otherwise lost.

In practicing my novel process, it is necessary to maintain the steeping water on the acid side of neutral. In most instances, no artificial means need be employed to maintain this desired condition of the steeping water. In some instances, however, the nature of the grain or other influences may be such that the steeping water may become alkaline and under these circumstances some artificial means of restoring the acidity of the steeping water may have to be used.

In lieu of practicing my invention by slowly building up the vitamin content of the steeping liquid in the manner hereinabove described, the steeping liquid used for the first or any succeeding batch of grain may be given a sufficiently high concentration of such vitamin by introducing therein the necessary quantity of powdered scutellum or other carriers of such vitamins to give the desired concentration.

In the foregoing description, I have described the powdered scutellum of the wheat grains as being utilized to enrich steeping water for treating other batches of wheat grains. My invention, however, is not limited to such use and the powdered vitamin rich scutellum may also be used to enrich steeping water for treating batches of rice or other cereal grains where it is desirable to enrich the endosperm of such grains with natural vitamin B. This scutellum powder may be either introduced directly into the digester or other vessel in which such other cereal grains are steeped, or may be introduced into the steeping water or other liquid in a preliminary step in the process of vitamin enrichment.

While I prefer to utilize, as a source of vitamin enrichment, the scutellum of wheat grains which have previously been subjected to a vitamin enriching process, advantageous results can be obtained by utilizing in my process powdered scutellum obtained from wheat grains in the natural, unprocessed state. Where powdered scutellum from natural or unprocessed wheat grains is utilized, a larger quantity of this powder must be utilized to produce a given enrichment of the steeping water than is necessary where powdered scutellum of vitamin enriched wheat grains is utilized.

I have found that it is advisable to grind the scutellum as fine as is economically and technically possible, as the ease and the proportion of vitamins extractable therefrom increases with the reduction in size of the particles of the scutellum powder. I have obtained excellent results where these particles are approximately the size of the starch granules of the endosperm, or even smaller than such size.

The powder may be dry powder formed by a dry grinding operation, or the powder may be in the form of fine particles suspended in water or other liquid as a result of a wet grinding operation.

I claim:

1. That process of enriching cereal grains with natural vitamins which comprises grinding substantially starch-free, germ-free, and bran-free scutellum of wheat grains to a powder to reduce the vitamin retaining properties of the scutellum, and using the ground scutellum to increase the vitamin content of liquid in which cereal grain is steeped to enrich the natural vitamin content of the endosperm of the steeped grain.

2. That process of enriching cereal grains with natural vitamins of the B complex which comprises grinding substantially starch-free, germ-free, and bran-free scutellum of wheat grains to a fineness approximating the size of the starch granules of the endosperm to reduce the vitamin retaining properties of the scutellum and using the ground scutellum to increase the vitamin content of liquid in which cereal grain is steeped to enrich the natural vitamin content of the endosperm of the steeped grain.

3. That process of enriching the endosperm of cereal grain with natural vitamins which comprises steeping the grain in a liquid containing substantially starch-free, germ-free, and bran-free scutellum ground to approximately the size of the starch granules of the endosperm whereby the natural vitamins of the scutellum are dissolved by the liquid and introduced with the liquid into the endosperm of the grain being steeped.

4. That method of enriching the endosperm of cereal grain with natural vitamins which comprises steeping a first batch of grain in liquid containing powdered scutellum that is substantially free from starch, germ, and bran, separating the steeping liquid from the grain, filtering the steeping liquid to remove the powdered scutellum therefrom, repeatedly using the steeping liquid for successive batches of grain, and adding a fresh batch of powdered scutellum to the steeping liquid each time it is used for steeping a batch of grain.

5. That method of enriching the endosperm of cereal grains with natural vitamins which comprises steeping whole wheat grain to increase the natural vitamin content of the scutellum of the steeped grain, separating the enriched scutellum from the remainder of the grain whereby to render said scutellum substantially free from starch germ, and bran, grinding the enriched scutellum to a powder at least as fine as the starch granules of the endosperm of a subsequent batch of grain to be enriched, mixing the powdered scutellum with liquid used in steeping said second batch of grain, and steeping said subsequent batch in such liquid.

6. That method of enriching the endosperm of cereal grain with natural vitamin which comprises steeping whole wheat grain to increase the natural vitamin content of the scutellum of the steeped grain, separating the enriched scutellum from the remainder of the grain whereby to render said scutellum substantially free from starch, germ, and bran, grinding the enriched scutellum to a powder at least as fine as the starch granules of the endosperm of another batch of grain to be enriched, mixing the powdered scutellum with liquid used in steeping said other batch of grain, steeping said other batch in such liquid, and repeatedly using such liquid for subsequent batches.

7. That process of enriching cereal grains with natural vitamins which comprises separating the scutellum of wheat grains from the remainder of such grains whereby to render the scutellum substantially free from starch, germ, and bran, steeping a batch of cereal grains in a liquid to impart to the endosperm of the steeping grains vitamins contained in the steeping liquid, and utilizing the separated scutellum as a source of natural vitamins for such steeping liquid.

8. That process of enriching the endosperm of cereal grains with natural vitamins which comprises steeping a batch of whole wheat grains in a liquid to enrich the scutellum and endosperm of such grains with natural vitamins, separating the steeping liquid from such batch, separating the scutellum from the grains of such batch in a manner to render the scutellum substantially free from starch, germ, and bran, adding the separated scutellum to the separated steeping liquid, re-using this steeping liquid to steep another batch of whole wheat grains, and repeatedly re-using the steeping liquid and scutellum from one batch to enrich the grains of a subsequent batch.

9. That method of enriching the endosperm of cereal grains with natural vitamins which comprises steeping whole wheat grains to increase the natural vitamin content of the scutellum of the steeped grains, separating the enriched scutellum from the remainder of the grains in a manner to render said scutellum substantially free from starch, germ, and bran, grinding the enriched scutellum to a fine powder, mixing the powdered scutellum with steeping liquid, and steeping a batch of different kind of cereal grains in said liquid to enrich the endosperm of said last-named grains.

ERICH GUSTAV HUZENLAUB.